United States Patent
Gentilcore et al.

(10) Patent No.: US 12,369,615 B2
(45) Date of Patent: Jul. 29, 2025

(54) NONWOVEN FABRIC FOR ORAL POUCHED PRODUCT, AND METHODS OF MANUFACTURING A NONWOVEN FABRIC

(71) Applicant: Nonwovenn Ltd, Bridgwater (GB)

(72) Inventors: Giovanni Gentilcore, Bridgwater (GB); Adrian Bisson, Bridgwater (GB); Dave Hill, Bridgwater (GB)

(73) Assignee: Nonwovenn Ltd, Bridgwater (GB)

( * ) Notice: Subject to any disclaimer, the term of this patent is extended or adjusted under 35 U.S.C. 154(b) by 246 days.

(21) Appl. No.: 17/921,150

(22) PCT Filed: Apr. 22, 2021

(86) PCT No.: PCT/EP2021/060597
§ 371 (c)(1),
(2) Date: Oct. 25, 2022

(87) PCT Pub. No.: WO2021/219494
PCT Pub. Date: Nov. 4, 2021

(65) Prior Publication Data
US 2023/0180816 A1   Jun. 15, 2023

(30) Foreign Application Priority Data
Apr. 27, 2020 (GB) .................................. 2006143

(51) Int. Cl.
*D04H 1/4258* (2012.01)
*A24B 13/00* (2006.01)
(Continued)

(52) U.S. Cl.
CPC .......... *A24B 13/00* (2013.01); *D04H 1/4258* (2013.01); *D04H 1/58* (2013.01); *D06N 3/0011* (2013.01);
(Continued)

(58) Field of Classification Search
CPC .......... A24B 15/283; A24B 15/28–284; A24B 13/00–02; D04H 1/4258; D04H 1/58;
(Continued)

(56) References Cited

U.S. PATENT DOCUMENTS

2007/0261707 A1* 11/2007 Winterson ............. A24B 13/00
                                                        131/357
2011/0180087 A1    7/2011 Gee et al.
(Continued)

FOREIGN PATENT DOCUMENTS

CN   104169346 A    11/2014
EP   0 599 425 A1    6/1994
(Continued)

OTHER PUBLICATIONS

Second Office Action and English translation dated Mar. 9, 2024, from corresponding Chinese Application No. 202180029892.6.
(Continued)

Primary Examiner — Larissa Rowe Emrich
(74) Attorney, Agent, or Firm — Troutman Pepper Locke LLP (57) ABSTRACT

A nonwoven fabric for manufacturing an oral pouched product, where the nonwoven fabric is chewable to increase its liquid permeability. When the nonwoven fabric is used to form a pouch, it may thus control the release of substances from within the pouch. The nonwoven fabric can be formed by applying a diffusion restricting treatment to a base nonwoven fabric. The diffusion restricting treatment may include any of (a) incorporating a digestible compound; (b) incorporating a superabsorbent polymer; (c) incorporating a hydrophobic material; and (d) forming a deformable barrier layer.

11 Claims, 4 Drawing Sheets

(51) Int. Cl.
*D04H 1/58* (2012.01)
*D06N 3/00* (2006.01)
*D06N 3/04* (2006.01)
*D06N 3/12* (2006.01)
*D06N 3/14* (2006.01)

(52) U.S. Cl.
CPC ......... *D06N 3/0059* (2013.01); *D06N 3/0088* (2013.01); *D06N 3/042* (2013.01); *D06N 3/047* (2013.01); *D06N 3/12* (2013.01); *D06N 3/14* (2013.01); *D06N 2205/02* (2013.01); *D06N 2205/16* (2013.01); *D06N 2209/121* (2013.01); *D06N 2209/128* (2013.01); *D10B 2401/021* (2013.01); *D10B 2505/10* (2013.01)

(58) Field of Classification Search
CPC .. D06N 3/0011; D06N 3/0059; D06N 3/0088; D06N 3/042; D06N 3/047; D06N 3/12; D06N 3/14; B32B 27/12; B32B 27/28; B32B 27/42
See application file for complete search history.

(56) References Cited

U.S. PATENT DOCUMENTS

| | | |
|---|---|---|
| 2012/0103356 A1 | 5/2012 | Sebastian et al. |
| 2013/0149254 A1 | 6/2013 | Gedevanishvili et al. |
| 2013/0186419 A1 | 7/2013 | Gao et al. |
| 2014/0026912 A1 | 1/2014 | Rushforth et al. |
| 2014/0261480 A1* | 9/2014 | Carroll ................ A24B 15/186 131/290 |
| 2016/0073689 A1 | 3/2016 | Sebastian et al. |
| 2016/0157515 A1* | 6/2016 | Chapman ............... A24B 15/42 131/352 |
| 2018/0153211 A1 | 6/2018 | Persson |

FOREIGN PATENT DOCUMENTS

| | | |
|---|---|---|
| WO | 03/053175 A2 | 7/2003 |
| WO | 2009/010884 A2 | 1/2009 |
| WO | 2016/090075 A1 | 6/2016 |

OTHER PUBLICATIONS

English translation of the Supplementary Search Report dated Mar. 7, 2024, from corresponding Chinese Application No. 202180029892.6.
Patents Act 1977: Search Report under Section 17(5) issued in GB Application No. GN2006143.8 dated Oct. 23, 2020.
International Search Report issued in PCT/EP2021/060597 dated Jul. 16, 2021.

* cited by examiner

NONWOVEN FABRIC FOR ORAL POUCHED PRODUCT, AND METHODS OF MANUFACTURING A NONWOVEN FABRIC

CROSS REFERENCE TO RELATED APPLICATIONS

The present application is a U.S. National Phase Application under 35 U.S.C. § 371 of International Patent Application No. PCT/EP2021/060597 filed Apr. 22, 2021, which claims priority of GB Patent Application No. 2006143.8 filed Apr. 27, 2020. The entire contents of which are hereby incorporated by reference.

TECHNICAL FIELD

The invention relates to a nonwoven fabric for use in manufacturing oral pouched products. In particular, the invention relates to a nonwoven fabric configured to control the rate at which substances are released from a pouch made from the nonwoven fabric.

BACKGROUND

It is known to use such nonwoven fabrics to manufacture a pouch for containing an individual portion of a product, such as smokeless tobacco (also known as "snus"), coffee, tea, etc., from which flavor is to be extracted. Examples of pouched products formed from a nonwoven fabric can be found in US 2014/0026912 A1 and US 2012/0103353 A1.

Nonwoven fabrics are typically produced using one of three processes: dry-laid, wet-laid or spun melt. Each process entangles fibers or filaments into a web in a manner that does not require weaving or knitting.

A dry-laid process typically comprises forming a loose web of staple fibers, which are subsequently bonded together to create the fabric. The web may be formed by an air laying process, whereby the fibers are randomly orientated in the web.

Alternatively, forming the web may include carding the fibers, which aligns their orientation. The air laid or carded web can be bonded using mechanical (e.g. hydroentanglement or needle punching), thermal (e.g. where the web includes thermoplastic fibers) or chemical techniques (e.g. using an adhesive binder), or a combination thereof.

A wet-laid process typically comprises forming a slurry of fibers in water or other suitable liquid, which is deposited on a screen or mesh and then dried to form the web.

A spun melt process typically forms a web from continuous filaments spun directly from liquid (i.e. melted) plastic materials.

One known type of nonwoven fabric for use in pouched products is a dry-laid carded nonwoven fabric manufactured by Nonwovenn under the product code SDH27, which comprises staple fibers formed from regenerated cellulose (also known as viscose or rayon) together with a thermoplastic acrylic copolymer binder which facilitates the ability of the fabric to be heat sealed and provides a soft mouth feel. Other types of commercially available nonwoven fabrics include SDZ35, which is another type of dry-laid carded nonwoven fabric of viscose fiber having a fiber density of 1.7 dtex, together with a thermoplastic acrylic copolymer binder, and SYF32, which is a chemically (adhesively) bonded fabric of viscose fibers having a density of 1.7 dtex, polyester fibers having a density of 2.2 dtex, and acrylic binder.

Typically, the nonwoven fabrics used to produce pouched products are water-permeable, in order to permit substances (e.g. flavor) from the contents of the pouch to flow out.

Nonwoven fabric may be used to manufacture chewable pouches. For example, US 2018/0153211 A1 discloses a nonwoven fabric for manufacturing a pouched product, in which the pouch includes an elastic mesh of thermoplastic polyamide that ensures the pouch can endure repeated deformations caused by chewing. The elastic mesh in this example has a high percentage of open area (i.e. high porosity) to enable a rapid release rate of flavor from the pouch.

US 2013/0149254 A1 discloses a perforated chewable pouch made of a food grade material selected from silicone, latex, rubber or plastic. The pouch encloses a product that can be in a gel, semi-liquid, and/or liquid form. A user chews, sucks, and/or manipulates the pouch to cause the enclosed flavor product to leach out of the perforations into the user's mouth.

US 2014/0261480 A1 discloses a pouch formed from a fabric comprising melt-blown polymer fibers having a hydrophilic surface coating. The melt-blown material can be an elastomer (e.g. polymeric polyurethane) so that the pouch can tolerate being chewed.

SUMMARY

At its most general, the present invention provides a nonwoven fabric for manufacturing an oral pouched product, where the nonwoven fabric is chewable to increase its liquid permeability. When the nonwoven fabric is used to form a pouch, it may thus control the release of substances from within the pouch.

The nonwoven fabric of the invention preferably includes means to restrict diffusion of substances therethrough when in a liquid (e.g. aqueous) environment, which means can be removed or overcome through a chewing action. The nonwoven fabric may meanwhile exhibit air permeability to make it suitable for manufacturing a pouch.

Using a nonwoven fabric that is designed to restrict diffusion therethrough runs contrary to established practice in the field of snus pouches, where it is common to treat the pouch material or pouch contents in a manner that promotes diffusion through the pouch material.

Pouches made from the nonwoven fabric of the invention may be used to enclose any suitable material from which it is desirable to extract flavor, nutrients or any other chemical, e.g. for oral delivery. The pouch contents may comprise or consist of smokeless tobacco, pharmaceuticals, coffee, tea, etc. The ability to control the release of substances from the contents of a pouch in this context may be particular advantageous, e.g. where it is desirable for a drug dose to be delivered over a period of time rather than immediately. With the invention, the rate at which a substance is delivered (i.e. the diffusion or flow rate through the nonwoven fabric) may be determined through selection of properties of the nonwoven, e.g. during its manufacture.

According to a first aspect of the invention, there is provided a nonwoven fabric for forming an oral pouched product, the nonwoven fabric comprising: a nonwoven fabric substrate; and a diffusion restricting material on or in the nonwoven fabric substrate, wherein the diffusion restricting material is configured to provide a barrier to diffusion through the nonwoven fabric in aqueous environment, and wherein the barrier to diffusion is reducible by a chewing action. The nonwoven fabric thus naturally restricts the diffusion or liquid flow through it. When used to form a pouch, the nonwoven fabric thus initially inhibits the diffusion of pouch contents outwards when in an aqueous environment. This diffusion or flow restriction can be removed by chewing, thereby permitting release of the pouch contents. The pouch contents in this context may comprise a soluble flavor or medicament substance contained in the pouch.

This behavior may be contrasted with known pouches made from nonwoven material, which are manufactured to be immediately permeable.

The barrier to diffusion may be a reduced diffusion or flow rate compared with the nonwoven fabric substrate when used alone. Reducing the barrier through a chewing action may thus lead to an increase in the diffusion rate. The barrier may thus represent a temporary restriction of flow through the nonwoven fabric.

In some example, the barrier to diffusion may effectively make the nonwoven fabric liquid-impermeable. This may be advantageous in the manufacture of pouches which contain material that degrades on contact with liquid (e.g. water). For example, the liquid-impermeable property may obviate the need for other treatment or packaging for the nonwoven fabric or pouched product.

Herein, the term "chewing action" may mean any one or any combination of (1) presence of saliva, (2) presence of water, and (3) mechanical deformation. The ability to reduce the barrier to diffusion may arise any or any combination of this conditions. For example, the diffusion restriction material may be digestible, such that the presence of saliva causes it to break down and be removed. In another example, the diffusion restriction material may be water soluble, such that the presence of water causes it to break down and be removed. In yet other examples, the diffusion restriction material may comprise a hydrophobic coating or a semipermeable membrane, where diffusion is inhibited by a hydrophobic capillary action. Deformation caused by chewing can be capable of overcoming the capillary action to permit diffusion through the barrier.

The diffusion restricting material may form a layer on the nonwoven fabric substrate. For example, the nonwoven fabric may comprise a laminated structure. The diffusion restricting material may comprise a semipermeable membrane, e.g. a layer of material formed with pores having a size that restrict liquid diffusion whilst allowing gas (air) diffusion. The layer may be resilient deformable, whereby the chewing action changes the size of the pores to permit diffusion. In on example, the diffusion restricting material may comprise a layer of thermoplastic polyurethane laminated on the nonwoven fabric substrate.

Alternatively or additionally, the diffusion restricting material may be integrated within the nonwoven fabric substrate. For example, the diffusion restricting material may be distributed throughout a bonded web of fibers formed by the nonwoven fabric substrate.

The diffusion restricting material may comprise a digestible liquid-impermeable component. The digestible liquid-impermeable component may comprise or consist of any one or any combination of: a modified starch, hydroxypropyl methylcellulose (HPMC), polyvinyl alcohol (PVA), lactose and sucrose. The material of the digestible liquid-impermeable component may thus be similar that used for coating tablets or the like.

The diffusion restricting material may comprise a superabsorbent polymer. The superabsorbent polymer may operate to absorb water and swell to create a physical barrier to diffusion within the nonwoven fabric. The physical barrier may be overcome by chewing. The superabsorbent polymer may be water soluble, so that it is gradually removed when in an aqueous environment. The superabsorbent polymer may comprise or consist of any one or any combination of: a water-soluble grade of sodium polyacrylate; a superabsorbent alginate; and carboxymethyl cellulose.

The diffusion restricting material may comprise a hydrophobic material. The hydrophobic material may comprise or consist of any one or any combination of: polyethylene; polytetrafluoroethylene; and a fluorosurfactant.

The nonwoven fabric substrate may be produced using any known process, such as the three processes mentioned above: dry-laid, wet-laid or spun melt. The nonwoven fabric substrate thus comprises a web of entangled fibers or filaments formed in a manner that does not require weaving or knitting. The nonwoven fabric substrate may be a conventional nonwoven fabric, e.g. of the type already used to manufacture oral pouched products.

In one example, the nonwoven fabric substrate may comprise a bonded web of viscose fibers and a binder, e.g. a thermoplastic acrylic binder. The viscose fibers may have a fiber density equal to or less than 1.7 dtex. It should be noted that this is just one example of the type of nonwoven fiber substrate to which the invention can be applied. The effects of applying the diffusion restricting material will be applicable to any type of permeable nonwoven fabric, especially those known for use in manufacturing oral pouched products.

The nonwoven fabric may have an air permeability equal to or greater than 700 $l/m^2/s$, and more preferably equal to or greater than 1500 $l/m^2/s$. An air permeability above this threshold may facilitate the formation of a pouched product by allowing air to escape at an appropriate rate when the contents of the pouch is enclosed.

The nonwoven fabric is preferably heat sealable. In this context, heat sealable may mean an ability to form a physical connection to itself upon application of heat. The heat may be applied in combination with pressure, e.g. at a certain location (seal line) on the nonwoven fabric. This property may permit an oral pouched product formed of the material to be closed using known heat sealing techniques. The heat sealable property may be provided by a binder integrated in the nonwoven fabric substrate, as is conventional.

In another aspect, the invention provides a method for manufacturing a nonwoven fabric, the method comprising: forming a nonwoven fabric substrate; and applying a diffusion restricting material to the nonwoven fabric substrate, wherein the diffusion restricting material is configured to provide a barrier to diffusion through the nonwoven fabric in aqueous environment, and wherein the barrier to diffusion is reducible by a chewing action. Features of the first aspect discussed above may be equally applicable to the second aspect. For example, forming the nonwoven fabric substrate may be done using any conventional technique.

The step of applying the diffusion restricting material may comprise: immersing the nonwoven fabric substrate in a solution of the diffusion restricting material; removing excess solution; and drying the nonwoven fabric substrate to leave the diffusion restricting material within the nonwoven fabric substrate. Immersing the nonwoven fabric substrate may include dipping in a pan containing the solution, or using any of a roll-to-roll coating process, a printing process, a laminator, a dip-coating unit or a spray unit. Removing the excess solution may be performed by passing the wet nonwoven fabric substrate through a mangle having a nip pressure selected to squeeze out unwanted liquid. Drying the wet nonwoven fabric substrate may be achieved using any conventional technique, e.g. heating and/or air movement.

In one example, the step of applying the diffusion restricting material includes: immersing the nonwoven fabric substrate in a uncross-linked superabsorbent polymer precursor solution; and heating the nonwoven fabric substrate to introduce cross-linking in the superabsorbent polymer. The heating to induce cross-linking may also serve to dry the wet nonwoven fabric substrate.

In another example, the step of applying the diffusion restricting material may comprise laminating a layer of the diffusion restricting material on the nonwoven fabric substrate. The diffusion restricting material may be a semipermeable film, e.g. made of thermoplastic polyurethane or the like.

BRIEF DESCRIPTION OF THE DRAWINGS

Embodiments of the invention is discussed below in more detail with reference to the accompanying drawings, in which.

DETAILED DESCRIPTION

Discussed in detail below are four methods for manufacturing a nonwoven fabric that is suitable for forming an oral pouched product, and which has a diffusion restricting property that can be overcome by a chewing action when in a user's mouth.

The diffusion restricting property is integral or intrinsic to the nonwoven fabric in the sense that it is provided as part of the nonwoven manufacturing process. This means that a pouch formed from the nonwoven fabric will exhibit the diffusion restricting effects without requiring any further treatment, e.g. as part of the pouching process.

Each method therefore includes a certain step of applying a diffusion restricting treatment to a base nonwoven fabric during manufacture of the nonwoven fabric, as follows:

(a) incorporating a digestible compound into the base nonwoven fabric;

(b) incorporating a superabsorbent polymer into the base nonwoven fabric;

(c) incorporating a hydrophobic material into the base nonwoven fabric; and (d) forming a deformable barrier layer on or in a base nonwoven fabric, which acts as a barrier.

In all four methods, the resulting nonwoven fabric will exhibit an increase in diffusion rate therethrough when subjected to a chewing action in a liquid environment. Herein, chewing action may mean any of (1) presence of saliva (e.g. to remove the digestible compound), (2) presence of water (e.g. to remove a water soluble diffusion restrictor), and (3) mechanical deformation (e.g. to overcome capillary action of a hydrophobic material, or simply to force substance release through a restrictive barrier).

Examples of materials fabricated according to each of the four techniques are set out below. These examples were subjected to a diffusion rate test in which a flow of dye through a membrane of the test material is measured by observing a change in color of a clear liquid over time. In detail, a vessel is filled with a dye and the fabric to be tested is disposed as a membrane on the top of this vessel. This vessel is put in contact vertically with a tank containing clear liquid. As time passes, the clear liquid in the tank starts to have its color changed by the dye that diffuses through the membrane. A sample from the tank is collected at regular intervals and the absorbance at a wavelength corresponding to the color of the dye is measured in a spectrophotometer. With this data, it is possible to generate a curve showing absorbance over time, which correlates with the rate at which dye is diffusing into the tank. The faster the color change, the lower the restriction to flow. FIGS. 3 to 6 show graphs obtained using this test, for both an untreated nonwoven fabric (control) and a nonwoven fabric treated according to one of the methods set out herein. The graphs are normalized with respect to an absorbance value measured at the beginning of the test to remove any background effects.

As a reference we use the color absorption measurement obtained at a wavelength of 630 nm wavelength after 30 s of contact between the fabric and tank.

Summary of Examples

Table 1 shows various properties of the control and example fabrics discussed in more detail below.

TABLE 1

Properties of control and example fabrics

| Description | Weight (gsm) | Thickness (mm) | Air Permeability (1/m²/s) | Sealable Pouch? |
|---|---|---|---|---|
| Control 1 (SDZ35) | 34.2 | 0.215 | 3605 | Yes |
| Control 2 (SYF32) | 33.1 | 0.262 | 4774 | Yes |
| Example 1 (HPMC) | 38.4 | 0.188 | 708 | Yes |
| Example 2 (SAP) | 40.3 | 0.217 | 3130 | Yes |
| Example 3 (fluorocarbon) | 32.7 | 0.223 | 4317 | Yes |
| Example 4 (TPU) | 37.6 | 0.228 | 1645 | Yes |

The fabric weight test results were obtained using the NWSP130.1.R0 EDANA test method. The fabric thickness tests results were obtained using the NWSP120.6.R0 EDANA test method. The air permeability test results were obtained using the 140.1 EDANA test standard.

The final column is a test for whether the fabric is capable of forming a pouch having the required sealing strength for use in an oral pouched product. These test results were obtained using the CORESTA Recommended Method No. 90 on a heat-sealed pouch formed from the relevant fabric.

The table includes the properties of two control fabrics, which are nonwoven materials available commercially from Nonwovenn Ltd., having product codes SDZ35 and SYF32 respectively. One of these control fabric is used as a starting materials for each of the examples set out below, to enable the effect of the relevant treatment to be demonstrated.

Digestible Barrier

In a first example, a digestible compound is incorporated into a nonwoven fabric during manufacture to form a barrier, e.g. a water impermeable barrier, that restricts diffusion through the nonwoven fabric in a liquid environment. The barrier is digestible, e.g. removable by saliva amylase, so that the barrier disintegrates when the nonwoven fabric is subjected to a chewing action. The barrier thus breaks down, whereupon diffusion through the nonwoven fabric is permitted or enhanced.

Figure 1:
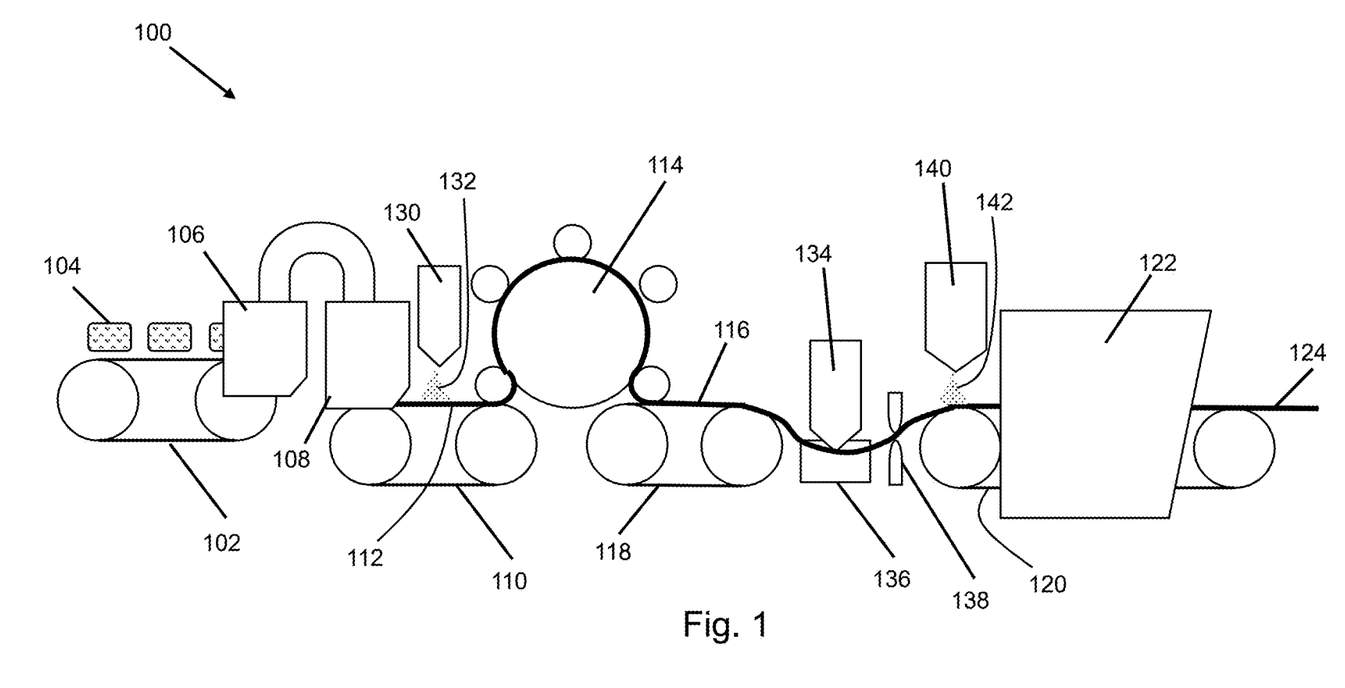
FIG. 1 is a schematic drawing of apparatus for dry-laid carded manufacture of a nonwoven fabric according to a method that is an embodiment of the invention.

A method of manufacturing a nonwoven fabric according to this example is now described with reference to FIG. 1. FIG. 1 is a schematic diagram showing an apparatus 100 for manufacturing a dry-laid carded nonwoven. However, it is to be understood that this aspect of the invention (incorporating a digestible compound) need not be limited to this type of manufacturing technique. The techniques for applying the digestible compound discussed below are applicable to all type of manufacturing technique, including wet-laid or spun melt techniques.

In the apparatus 100 shown in FIG. 1, a first conveyor 102 transports fiber bales 104 to a bale opener 106, which separates and blends the fibers from each bale. The fiber bales 104 may comprises bundles of any suitable staple fiber, such as regenerated cellulose (viscose) or the like. The bale opener 106 is connected to a feed hopper 108 that discharges the blended fibers as a loose fiber web 112 on a second conveyor 110. The loose fiber web 112 is conveyed to a carding machine 114 that combs the web to apply a desired orientation or plurality of orientations to the fibers in the web. The carding machine 114 thus outputs a carded web 116 on to a third conveyor 118.

The fibers in the carded web 116 may subsequently be bonded together by any conventional method. For example, a binder may be applied to the carded web, e.g. by conveying it using deflector 134 into a pan 136 filled with liquid binder or binder precursor, so that the binder impregnates or saturates the carded web 116. The carded web 116 is then transported to a fourth conveyor 120 via nip rollers 138, which operate to remove or squeeze excess liquid from the carded web 116. The web 116 is then carried through a dryer 122, which operates to dry the web and cure or stabilize the binder.

In other examples, the carded web 116 may be mechanically bonded, e.g. using hydroentanglement (spunlace) or needle punching techniques.

In yet further example, where the carded web 116 includes thermoplastic fibers, the fibers in the web can be thermally bonded, e.g. by passing the web through heat calendar rollers.

The resulting bonded web 124 may be wound into a finished roll, or can be subjected to additional finishing steps, such a crimping, perforating or the like.

In this example, the manufacturing process outlined above is adapted to add a digestible component to the web. The digestible component is selected to inhibit, restrict or prevent passage of liquid through the web. In other words, it may make the web liquid-impermeable.

The digestible component may be a food-safe compound used as a coating agent for tablets or the like. For example, the digestible component may comprise or consist of any one or any combination of: a modified starch, hydroxypropyl methylcellulose (HPMC), polyvinyl alcohol (PVA), lactose and sucrose.

The digestible component may be applied in a manner that forms a film or layer on or in the resulting nonwoven fabric. This can be done in a number of ways, as explained below.

In one example, the digestible component may be applied in a similar way to the binder discussed above. In other words, the digestible component may be provided in a solution (e.g. a water solution) or slurry held within a tray or pan 136 through which the carded web 116 is conveyed in order to saturate the web. After it has passed through the pan 136, any excess solution can be removed using nip rollers 138. Any remaining solvent will evaporate in the dryer 122 to leave a film or layer of the digestible component in the resulting bonded web 124. The digestible component may be applied to the carded web 116 at the same stage as the binder, using the same pan or a different pan. Starch is a food-approved film former that is suitable for use as the digestible component. Hydrolyzed starch typically has a high viscosity, so in this application technique it may be applied as an insoluble dispersion, with a subsequent heating or drying step to hydrolyze the starch on the fabric in order to form a film. A thickening agent, such as HPMC, may be added to stabilize the dispersion, i.e. to inhibit or prevent the starch settling out. As noted above, the HPMC may also acts directly in film formation.

In other examples, the digestible component can be applied in other ways. For example, the digestible component may be applied as a spray 132 delivered via one or more jets 130 located over the first conveyor 110. In this example, the spray 132 is applied to the loose fiber web 112 output from the hopper 108, before it runs through the carding machine 114. In practice, the digestible component may be sprayed on to the web at any point on its path from the hopper 118 to the dryer 122. For example, a spray 142 may be applied from one or more jets 140 located over the third conveyor 120. In this example, the spray 142 is applied to the carded web 116 after it is impregnated with binder.

In another example, the digestible component may be applied as a coating on the web, e.g. using any of a roll-to-roll coating process, a printing process, a laminator, a dip-coating unit or a spray unit. This process may occur separately from the apparatus 100 shown in FIG. 1, e.g. after the bonded web 124 is produced. Alternatively, it may be provided within the dryer 122.

The properties of the layer or film of the digestible component within the resulting nonwoven fabric may be controlled through either or both of (i) the concentration of the digestible component in the solution that is applied, and (ii) the nip pressure applied by the nip rollers 138 that configured to remove excess liquid from the carded web 116.

Example 1: Starch/HPMC-Treated Nonwoven Fabric

In a first example, hydrolyzed starch is used as a food-approved film in order to reduce permeability and slow flavor transfer through a nonwoven fabric. It is anticipated that on exposure to water (and in particular to amylase present in saliva), the starch film gradually be removed, thereby provided an initial restriction on liquid permeability that is gradually reduced upon chewing. Since flavor from the content of a pouch formed from the nonwoven fabric depends on the liquid permeability of the nonwoven fabric, the starch film enables a release of flavor that is linked to the chewing process.

Owing to its high viscosity, it is difficult to apply hydrolyzed starch to a nonwoven fabric directing using a conventional padding process. In this example, the starch was instead applied as an insoluble dispersion, where the heat of drying process was also used to hydrolyze the starch on the fabric in order to form the film. In order to avoid the starch settling out when applying the dispersion, a food approved thickening agent was used to thicken the starch dispersion. The thickener used in this example was HPMC (hydroxypropyl methylcellulose). HPMC is capable of forming a film alone, which further facilitates the formation of the starch film in this example.

The insoluble dispersion used in this example therefore consisted of a mixture of 58 wt % water, 9 wt % maize starch, and 33 wt % of thickening agent E464 (which is a type of food grade HPMC).

The insoluble dispersion was disposed in a trough similar to pan 136 discussed above. In this example, a web of SDZ35 nonwoven fabric was conveyed through the trough to be immersed in the insoluble dispersion. Upon exit from the trough, excess liquid was removed from the nonwoven fabric using a mangle which squeezed the fabric using a nip pressure selected to obtain a total wet fabric weight of around 50 gsm. The wet fabric is then dried, following which the fabric weight was measured to be 38.4 gsm, which indicates that the dry weight of the added film was less than 5 gsm.

Figure 3:
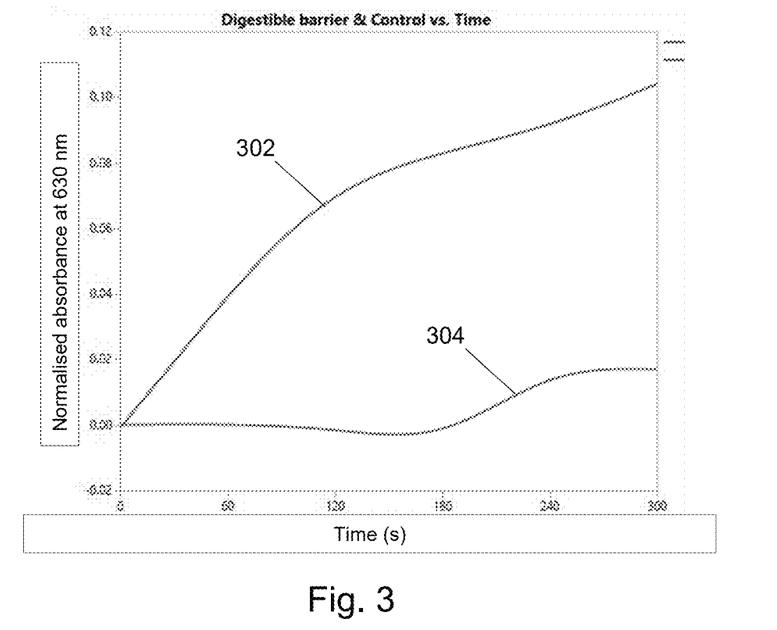
FIG. 3 is a graph showing diffusion rate for a nonwoven fabric treated with starch compared with the untreated nonwoven fabric.

FIG. 3 is a graph showing diffusion rate for a nonwoven fabric treated with starch according to the process discussed above compared with the untreated nonwoven fabric. The diffusion rate was measured using the test methodology outlined above.

The diffusion rate for the untreated nonwoven fabric (control 1: SDZ35) is indicated by line 302 in the graph. As expected, it shows that the fabric is essentially completely liquid permeable, as there is a steady increase in the amount of dye diffusing through the fabric into the tank. The diffusion rate for the nonwoven fabric having a starch coating is indicated by line 304. It can be seen that the fabric presents a barrier to the dye (indicative of a restriction to liquid permeability) for about 180 seconds, whereupon the coating appears to breakdown to permit diffusion.

It is expected that the presence of amylase in saliva and the mechanical action of chewing would contribute to a more rapid breakdown of the barrier when placed in the mouth. However, it can be understood that even in that use environment the coated nonwoven fabric of the present example would provide a restriction to diffusion.

Superabsorbent Polymer

In a second example, a superabsorbent polymer (SAP) is incorporated into a nonwoven fabric during manufacture. When exposed to an aqueous environment (e.g. the user's mouth), the SAP absorbs liquid, whereupon it swells within the nonwoven fabric to form a barrier that restricts molecular movement through the nonwoven fabric.

The barrier formed by the SAP is removable by a chewing action. The SAP may itself be water soluble. The chewing action thus promotes its dissolution from the nonwoven fabric, whereupon diffusion through the nonwoven fabric is permitted. The superabsorbent polymer may be any conventional water-soluble food grade SAP, such as sodium polyacrylate or the like. To assist in applying the SAP, it may be advantageous to use a dissolvable superabsorbent fiber. In this example, the SAP used was an uncross-linked dissolvable grade of sodium polyacrylate. However, any uncross-linked SAP may be used, including alginates or carboxymethyl cellulose.

The rate at which the SAP is removed from the nonwoven fabric (by dissolving the sounding liquid) may be controlled by causing the SAP to become cross-linked. This is because the cross-links need to be physically broken down (e.g. by the mechanical action of chewing) before the SAP can dissolve. Thus, the more cross-links that are present, the longer it takes for the SAP to dissolve.

In the example given below, the SAP is applied in a form without any cross-linking. Cross-linking can be introduced, if desired, when the SAP is already incorporated in the nonwoven fabric through the application of heat, e.g. during a drying process.

A nonwoven fabric according to this example can also be manufactured as a dry-laid carded nonwoven using the apparatus 100 described above with reference to FIG. 1. However, it is to be understood that this aspect of the invention (incorporating a SAP) need not be limited to this type of manufacturing technique. The techniques for applying the SAP discussed below are applicable to all type of manufacturing technique, including wet-laid or spun melt techniques.

The SAP may be applied in a similar way to the digestible component discussed above. For example, the SAP may be applied by impregnating the carded web, e.g. by dipping it in a pan of SAP solution. In other words, the SAP may be provided in a solution (e.g. a water solution) or slurry held within a tray or pan 136 through which the carded web 116 is conveyed in order to saturate the web. After it has passed through the pan 136, any excess solution can be removed using nip rollers 138. Any remaining solvent will evaporate in the dryer 122 to leave the SAP distributed within the resulting bonded web 124. As discussed above, the dryer 122 (or a separate heater) may also be used to heat the web in order to cause cross-linking of the SAP. The SAP may be applied to the carded web 116 at the same stage as the binder, using the same pan or a different pan.

In another example, the SAP may be applied as a spray 132 delivered via one or more jets 130 located over the first conveyor 110. In this example, the spray 132 is applied to the loose fiber web 112 output from the hopper 108, before it runs through the carding machine 114. In practice, the SAP may be sprayed on to the web at any point on its path from the hopper 118 to the dryer 122. For example, a spray 142 may be applied from one or more jets 140 located over the third conveyor 120. In this example, the spray 142 is applied to the carded web 116 after it is impregnated with binder.

In another example, the SAP may be applied as a coating on the web, e.g. using any of a roll-to-roll coating process, a printing process, a laminator, a dip-coating unit or a spray unit.

It may be desirable to pre-treat the resulting nonwoven fabric produced by this example so that the SAP is already swollen to create the diffusion barrier. For example, where the nonwoven fabric is used to produce a pouched product, the pouch may be sprayed with water before packaging in order to create the barrier. This pre-treatment may ensure that the presence of SAP does not cause an unwanted initial dry mouthfeel for the pouch.

Example 2: SAP-Treated Nonwoven Fabric

In a second example, a coating of superabsorbent polymer (SAP) is formed on a nonwoven fabric to reduce permeability and slow flavor transfer through the fabric. It is anticipated that on exposure to water, the SAP film will swell to form a gel that inhibits diffusion, and then gradually be dissolved. This treatment therefore provides an initial restriction on liquid permeability that is gradually reduced upon chewing. Since flavor from the content of a pouch formed from the nonwoven fabric depends on the liquid permeability of the nonwoven fabric, the SAP film enables a release of flavor that is linked to the chewing process.

The SAP film may be applied to the nonwoven fabric using a highly dispersed gel or an inverse suspension formed with SAP materials. Alternatively, the SAP may be applied by impregnating the nonwoven fabric with a solution of superabsorbent fiber (SAF). This latter technique was used in the present example, where the nonwoven fabric was dipped in a solution of uncross-linked sodium polyacrylate fibers. In this example the solution consisted of a mixture of 88 wt % water and 12 wt % uncross-linked sodium polyacrylate fibers, which had a staple length of 50 mm.

The precursor solution was disposed in a trough similar to pan 136 discussed above. In this example, a web of SDZ35 nonwoven fabric conveyed through the trough to be immersed in the precursor solution. Upon exit from the trough, excess liquid was removed from the nonwoven fabric using a mangle which squeezed the fabric using a nip pressure selected to obtain a total wet fabric weight of around 100 gsm.

The wet fabric is then dried by application of heat, which acts to cure the polymer precursor. In this example, the drying temperature was limited to no more than 104° C. in order to prevent crosslinking in the SAP. However, in other examples, the temperature may be selected to introduce cross-linking into the SAP, or the SAP may be already cross-linked before application, e.g. when applied as a dispersed form using gel or inverse suspension SAP types.

After drying, the fabric weight was measured to be 40.3 gsm, which indicates that the dry weight of the added film was less than 10 gsm, i.e. around 6 gsm.

Figure 4:
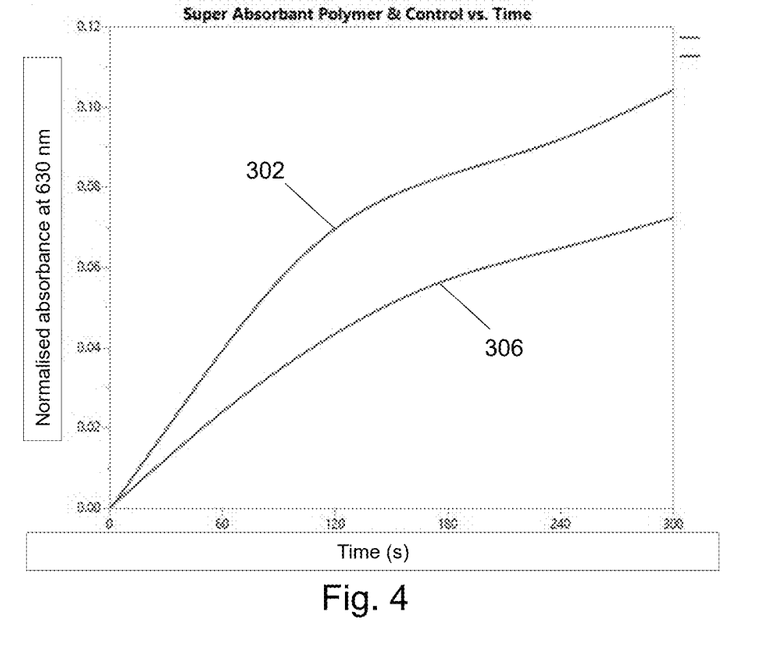
FIG. 4 is a graph showing diffusion rate for a nonwoven fabric treated with a superabsorbent polymer compared with the untreated nonwoven fabric.

FIG. 4 is a graph showing diffusion rate for a nonwoven fabric treated with SAP according to the process discussed above compared with the untreated nonwoven fabric. The diffusion rate was measured using the test methodology outlined above.

The diffusion rate for the untreated nonwoven fabric (control 1: SDZ35) is indicated by line 302 in the graph. As expected, it shows that the fabric is essentially completely liquid permeable, as there is a steady increase in the amount of dye diffusing through the fabric into the tank. The diffusion rate for the nonwoven fabric having a SAP coating is indicated by line 306. It can be seen that the treated fabric permits diffusion, but at a lower rate than the untreated fabric. The presence of the SAP therefore presents a barrier to the dye (indicative of a restriction to liquid permeability).

It is expected that the mechanical action of chewing would permit an enhanced flow through the barrier. Similarly, the level of restriction provided by the SAP may be adjusted by controlling the cross-link density of the SAP, e.g. by setting the temperature and duration of drying appropriately.

Hydrophobic Treatment

In a third example, a hydrophobic material is incorporated into or on a nonwoven fabric during manufacture. The hydrophobic material operates to introduces a barrier to diffusion through the nonwoven by altering the surface energy thereof to restrict wetting in a user's mouth. In other words, the hydrophobic material increases an energy threshold for capillary flow of substances through the nonwoven. This energy threshold can be overcome by the physical action of chewing, whereupon substances are released through the nonwoven fabric.

The hydrophobic material may be provided by any suitable food grade surfactant, such a food-approved polyethylene or a fluorosurfactant in which the hydrophobic material has a fluorocarbon tail. However, other hydrophobic materials can be used. For example, various waxes, oils and silicone materials exhibit hydrophobic properties and are capable of application to a nonwoven fabric. Other examples include polytetrafluoroethylene, perfluoroalkyl acrylic copolymerisate cationic alcoholic solution, and various types of surfactants (e.g. anionic, cationic, non-ionic, zwitterionic and amphoteric surfactants). Yet further examples may be other materials that exhibit particularly hydrophobic properties, such as magnesium oxide polystyrene, zinc oxide polystyrene, precipitated calcium carbonate, carbon nanotubes, fluorinated silanes and fluoropolymers.

A nonwoven fabric according to this example can also be manufactured as a dry-laid carded nonwoven using the apparatus 100 described above with reference to FIG. 1. However, it is to be understood that this aspect of the invention (incorporating a hydrophobic material, e.g. using a surfactant) need not be limited to this type of manufacturing technique. The techniques for applying the hydrophobic material discussed below are applicable to all type of manufacturing technique, including wet-laid or spun melt techniques.

The hydrophobic material may be applied in a similar way to the digestible component discussed above. For example, the hydrophobic material may be applied by impregnating the carded web, e.g. by dipping it in a pan of hydrophobic material solution. In other words, the hydrophobic material may be provided in a solution (e.g. a water solution) or slurry held within a tray or pan 136 through which the carded web 116 is conveyed in order to saturate the web. After it has passed through the pan 136, any excess solution can be removed using nip rollers 138. Any remaining solvent will evaporate in the dryer 122 to leave the hydrophobic material distributed within the resulting bonded web 124. The hydrophobic material may be applied to the carded web 116 at the same stage as the binder, using the same pan or a different pan. In some examples, the hydrophobic material may be a water soluble fluorinated copolymer, in which case the film is formed by remove the water solvent. In other examples, the hydrophobic material may be an insoluble fluorocarbon material, which is applied as a dispersion.

In another example, the hydrophobic material may be applied as a spray 132 delivered via one or more jets 130 located over the first conveyor 110. In this example, the spray 132 is applied to the loose fiber web 112 output from the hopper 108, before it runs through the carding machine 114. In practice, the hydrophobic material may be sprayed on to the web at any point on its path from the hopper 118 to the dryer 122. For example, a spray 142 may be applied from one or more jets 140 located over the third conveyor 120. In this example, the spray 142 is applied to the carded web 116 after it is impregnated with binder.

In another example, the hydrophobic material may be applied as a coating on the web, e.g. using any of a roll-to-roll coating process, a printing process, a laminator, a dip-coating unit or a spray unit. This process may occur separately from the apparatus 100 shown in FIG. 1, e.g. after the bonded web 124 is produced. Alternatively, it may be provided within the dryer 122.

Fluorocarbon coating fabric treatments typically operate by lowering the surface energy of the fiber, which in turn prevents the fiber from wetting out. To provide this function, the fluorocarbon includes perfluoroalkyl groups that are oriented outward from the fiber to produce a low surface energy barrier. This orientation is usually achieved by curing the fluorocarbon-treated fabric by heating at a specific temperature. However, an advantage of using a water soluble fluorinated copolymer, as discussed in the example below, is that the orientation of the perfluoroalkyl groups is achieved using a lower temperature than required for dispersion-type fluorocarbon coatings. The inventors have found that desired hydrophobic properties can be obtained by heating a water soluble fluorinated copolymer at temperatures that are similar to standard fabric drying conditions. This facilitates the incorporation of this technique into the fabrication process.

Example 3: Hydrophobic-Treated Nonwoven Fabric

In a third example, a food approved fluorocarbon material was used to treat a nonwoven fabric in order to restrict or delay flavor transfer by providing an oil/water repellent property. The fluorocarbon material used in this example was a water soluble perfluoroalkyl acrylic copolymerisate cationic alcoholic solution. Suitable water soluble fluorocarbon materials include Nuva® N6336 from Archroma and CornelRepel 111 from Cornelius Group. A non-fluorine based alternative is Smartrepel® Hydro AM from Archroma. Non-soluble alternative materials that can be applied as a dispersion or emulsion include Ruco-Guard AFC6 from Rudolf GmbH and Asahi Guard AG-E061 from AGC Chemicals Company.

In this example, the fluorocarbon material was applied as a second stage application, i.e. after the bonded web was produced. The fluorocarbon material used in this example was applied as a solution consisting of a mixture of 98 wt % water and 4 wt % of the fluorocarbon material.

Similar to Example 1, the solution of the fluorocarbon material was disposed in a trough similar to pan 136 discussed above. In this example, a web of SYF32 nonwoven fabric was conveyed through the trough to be immersed in the solution. Upon exit from the trough, excess liquid was removed from the nonwoven fabric using a mangle which squeezed the fabric using a nip pressure selected to obtain a total wet fabric weight that was 24.5 gsm greater than the base fabric (i.e. the SYF32 web).

The wet fabric was then dried in two stages. In a first stage, the fabric was dried in an environment having a maximum temperature of 122° C. In a second stage, the fabric was dried in an environment having a maximum temperature of 108° C. These temperatures enabled "curing" of the fluorocarbon material (i.e. appropriate orientation of the perfluoroalkyl groups) without over-curing the binder present in the nonwoven fabric. This ensures that the fluorocarbon material is properly integrated into the nonwoven fabric whilst retaining the ability of the treated nonwoven fabric to be heat sealable (e.g. to form a pouch). As mentioned above, a particular advantage of the present example is that the fluorocarbon material is cured at lower temperatures that would be needed for typical dispersion-type fluorocarbon materials.

After drying, the fabric weight was measured to be 32.7 gsm, which indicates that the dry weight of the added film was very small, i.e. less than 0.1 gsm. Note that the fabric weight of this example is less than the control 2 material set out in the table above owing to natural process variations, which can cause measured weight to vary by up to 10% from its target weight.

Figure 5:
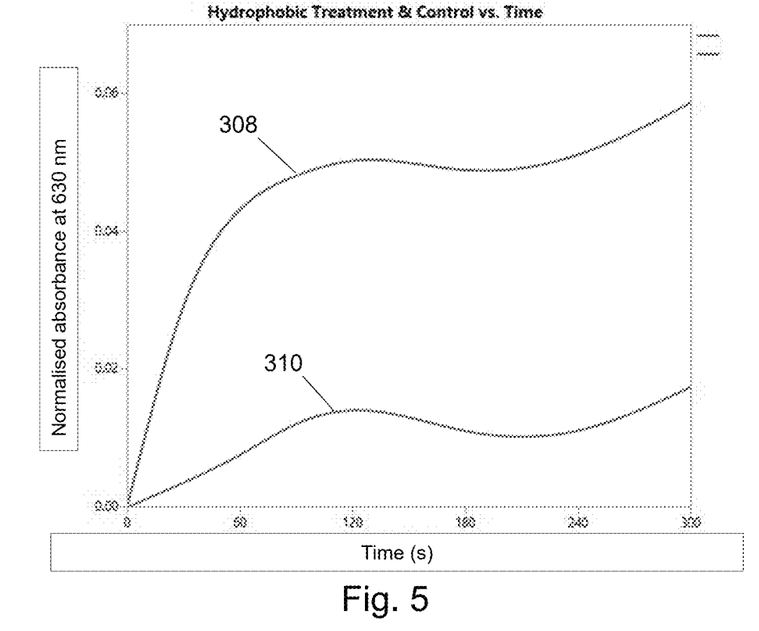
FIG. 5 is a graph showing diffusion rate for a nonwoven fabric treated with a fluorocarbon material compared with the untreated nonwoven.

FIG. 5 is a graph showing diffusion rate for a nonwoven fabric treated with a fluorocarbon material according to the process discussed above compared with the untreated nonwoven fabric. The diffusion rate was measured using the test methodology outlined above.

The diffusion rate for the untreated nonwoven fabric (control 2: SYF32) is indicated by line 308 in the graph. As expected, it shows that the fabric is essentially completely liquid permeable, as there is a rapid increase in the amount of dye diffusing through the fabric into the tank. The diffusion rate for the same nonwoven fabric treated with the fluorocarbon material is indicated by line 310. It can be seen that the treated fabric permits diffusion, but at a much lower rate than the untreated fabric. The presence of the fluorocarbon material therefore presents a barrier to the dye (indicative of a restriction to liquid permeability).

Laminated Barrier

In a fourth example, a deformable barrier layer is formed on a nonwoven base layer during manufacture. The resulting nonwoven material may thus comprise a two-layer structure that restricts diffusion therethrough. The deformable barrier layer may have a porous structure, in which the pores have a size selected to inhibit water diffusion when the barrier layer is in a non-deformed state. In use, the chewing action physically deforms the barrier layer to cause the pores to change in size and therefore permit diffusion, whereupon substances are released through the nonwoven fabric.

In one example, the deformable barrier layer is formed from thermoplastic polyurethane (TPU). The TPU layer may be formed as a web using a conventional meltblown process, in which the pore size of the TPU can be controlled through the parameters of the filament generation and laying process. The TPU layer may have a weight equal to or less than 30 gsm, preferably equal to or less than 20 gsm (e.g. 18 gsm), and more preferably equal to or less than 10 gsm. The TPU may be formed from a plurality of TPU filaments laid together in a layer. The porosity of the layer (and hence the permeability of the final laminated product) may be adjusted through selection of the filament size.

In a meltblown process, a microfiber nonwoven material is formed directly (i.e. in a single step) from a thermoplastic polymer. High velocity air is used to blow filaments extruded from a die towards a carrier conveyor system. Typically the fibers produced are of the range 2-6 µm. By depositing these filaments on a conventional (macrofibre) nonwoven substrate, the larger pores within the conventional nonwoven are covered or filled, thereby restricting its permeability.

The TPU layer in this example provides a dual function. Firstly, it improves the mechanical integrity of the underlying nonwoven, especially in the stress/strain response. This ensures that the material can cope with a chewing action. Secondly, it restricts the permeability of the underlying nonwoven, which means that a chewing action is required to enable flow therethrough.

The TPU layer can then be attached to (e.g. laminated on) a carrier nonwoven layer. The carrier nonwoven layer may be a conventional nonwoven fabric for fabricating oral pouched products. The TPU layer may act to strengthen the conventional material to make it chewable without breaking. Using the conventional nonwoven fabric may also ensure that a pouch formed from the material has a similar mouth-feel to known pouches. It also enables the pouch to be formed using standard pouching techniques. In contrast, a pouch formed from TPU only typically has to be filled in a non-standard manner because it does not exhibit sufficient air permeability.

Figure 2:
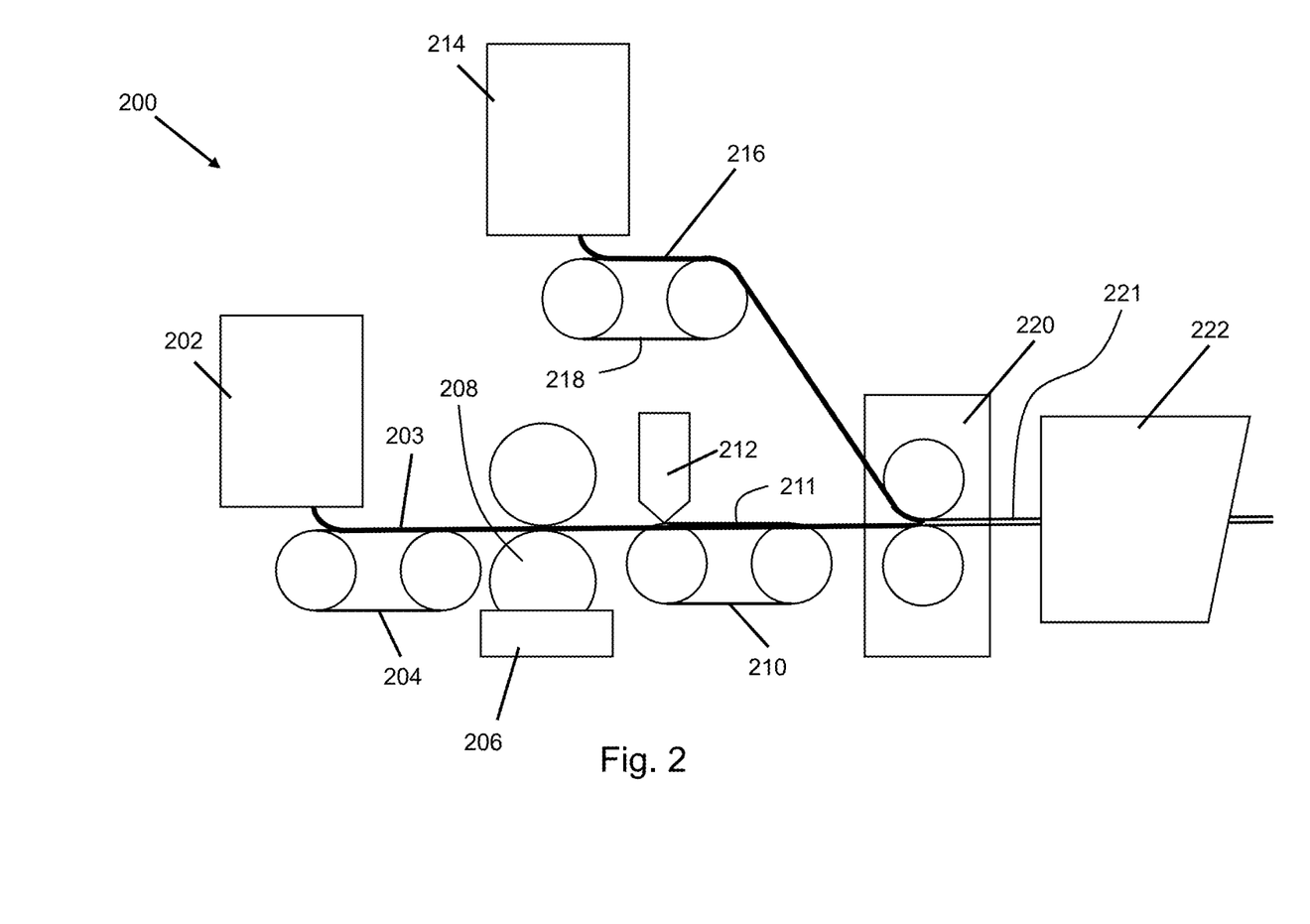
FIG. 2 is a schematic drawing of apparatus for manufacturing a laminated melt-blown nonwoven fabric according to a method that is another embodiment of the invention.

A method of manufacturing a nonwoven fabric according to this example is now described with reference to FIG. 2. FIG. 2 is a schematic diagram showing an apparatus 200 for manufacturing a laminated two-layer spun melt nonwoven. However, it is to be understood that this aspect of the invention (incorporating a barrier layer) need not be limited to this type of manufacturing technique. For example, the carrier layer to which the barrier layer is attached may be formed using any suitable manufacturing technique, such as the dry-laid carding technique discussed above with respect to FIG. 1, or a wet-laid technique. Similarly, whilst the TPU layer discussed below is manufactured using a meltblown process, it may be produced by any known technique for forming a web of polymer filaments.

The apparatus 200 comprises a first process line for forming a carrier nonwoven web. In this example, the carrier nonwoven web is formed using a meltblown technique. An extrusion module 202 is arranged to extrude filaments from a liquid polymer, which are heated by a warm air flow before being deposited as a web 203 on a first conveyor 204. This initial web 203 is then consolidated by applying adhesive from a pan 206 using a drum 208. Any excess adhesive is removed using a nip blade 212 or nip rollers to form a consolidated web 211. The consolidated web 211 is transported by a second conveyor 210 to a lamination module 220 and dryer 222, as explained in more detail below.

Although this example discusses consolidating the initial web using adhesive (i.e. chemical bonding), it is to be understood that other types of consolidation may also be used e.g. thermal bonding or mechanical bonding.

The apparatus 200 further comprises a second process line for forming a barrier web 216. In this example, the barrier web 216 is made of TPU formed using a meltblown technique. The second process line comprises an extrusion module 214 arranged to extrude filaments from molten TPU. The filaments are heated by a warm air flow before being deposited as the barrier web 216 on a third conveyor 218.

The barrier web 216 is transports to the lamination module 220, which is arranged to combine the barrier web 216 and consolidated web 211 into a laminated nonwoven fabric 221. The laminated nonwoven fabric 221 is moved into a dryer 222 for drying or curing the adhesive.

Example 4: TPU-Treated Nonwoven Fabric

In a fourth example, a nonwoven fabric having a layer of TPU formed thereon was used to restrict diffusion. The nonwoven fabric was made using the process set out in FIG. 2 above. The barrier web 216 was formed from TPU filaments, which were deposited directly on the consolidated web 211, which in this example was a dry-laid carded nonwoven fabric manufactured by Nonwovenn under the product code SDH22, which consists of viscose fibers having a fiber density of 1.7 dtex, together with a thermoplastic acrylic binder.

The TPU filaments for forming the barrier web 216 in this example were blown on to the consolidated web 211 to increase its mechanical resilience. The rate of deposition was controlled to be 30 gsm, but may be controlled to be any weight in the range 15 to 30 gsm, e.g. 18 gsm in this example. It may be desirable to control the rate of deposition such that the deformable web 216 adds a weight equal to or less than 10 gsm to the consolidate web 211.

One result of the improvement in mechanical properties provided by the barrier web, is a significant reduction in the permeability (pore size) of the consolidated web. In effect the TPU filaments span across the pores in the underlying fabrication. The reduced permeability is a benefit in terms of reducing flavor transfer through the fabric.

Figure 6:
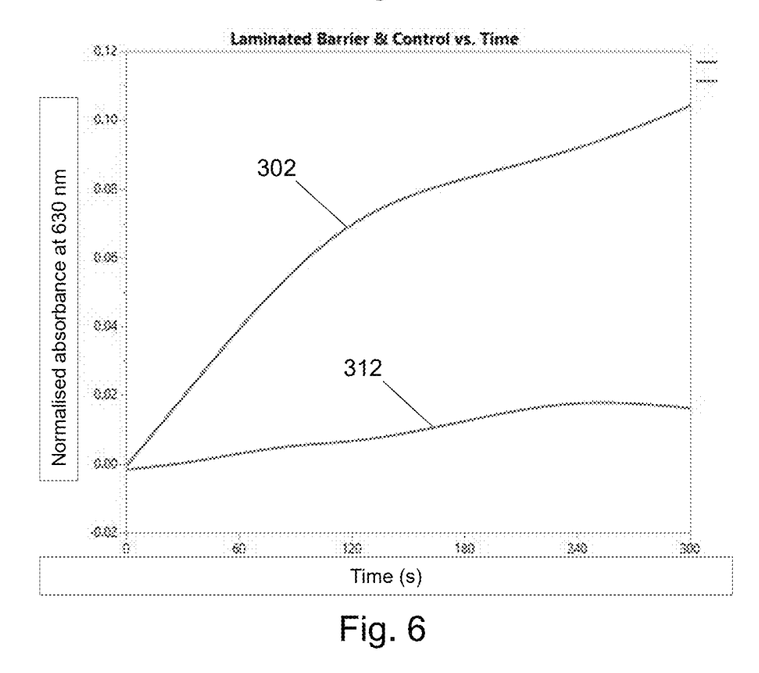
FIG. 6 is a graph showing diffusion rate for a nonwoven fabric having a barrier layer compared with the untreated nonwoven fabric.

FIG. 6 is a graph showing diffusion rate for a nonwoven fabric having a barrier layer produced from the process outlined above, compared with a nonwoven fabric without a barrier layer. The diffusion rate was measured using the test methodology outlined above.

The graph shows a diffusion rate for a typical nonwoven fabric without a barrier layer (control 1: SDZ35) indicated by line 302. As expected, it shows that the fabric is essentially completely liquid permeable, as there is a steady increase in the amount of dye diffusing through the fabric into the tank. The diffusion rate for the nonwoven fabric with a TPU barrier produced according to the process outlined above is indicated by line 312. It can be seen that the fabric presents a barrier to the dye (indicative of a restriction to liquid permeability).

It is expected that the mechanical action of chewing will overcome the barrier when the nonwoven fabric is placed in the mouth, e.g. by providing energy to deform the pores in the barrier layer to permit flavor to escape.

The invention claimed is:

1. A nonwoven fabric for forming an oral pouched product, the nonwoven fabric comprising:
   a nonwoven fabric substrate; and
   a layer of diffusion restricting material on the nonwoven fabric substrate,
   wherein the diffusion restricting material is configured to provide a barrier to diffusion through the nonwoven fabric in aqueous environment,
   wherein the barrier to diffusion provides a temporary restriction to diffusion through the nonwoven fabric that is reducible by a chewing action, and
   wherein the layer of diffusion restricting material is a superabsorbent polymer comprising a water-soluble grade of sodium polyacrylate.

2. A nonwoven fabric for forming an oral pouched product, the nonwoven fabric comprising:
   a nonwoven fabric substrate; and
   a layer of diffusion restricting material on the nonwoven fabric substrate,
   wherein the diffusion restricting material is configured to provide a barrier to diffusion through the nonwoven fabric in aqueous environment,
   wherein the barrier to diffusion provides a temporary restriction to diffusion through the nonwoven fabric that is reducible by a chewing action, and wherein the layer of diffusion restricting material comprises a hydrophobic fluorocarbon material.

3. The nonwoven fabric of claim 2, wherein the hydrophobic fluorocarbon material is a water soluble perfluoroalkyl acrylic copolymerisate cationic alcoholic solution.

4. The nonwoven fabric of claim 1, wherein the nonwoven fabric substrate comprises a heat-sealable bonded web of viscose fibers and a binder.

5. The nonwoven fabric of claim 4, wherein the binder is a thermoplastic binder.

6. The nonwoven fabric of claim 4, wherein viscose fibers have a fiber density equal to or less than 1.7 dtex.

7. The nonwoven fabric of claim 1, wherein the nonwoven fabric has an air permeability equal to or greater than 1500 l/m²/s.

8. The nonwoven fabric of claim 2, wherein the nonwoven fabric substrate comprises a heat-sealable bonded web of viscose fibers and a binder.

9. The nonwoven fabric of claim 8, wherein the binder is a thermoplastic binder.

10. The nonwoven fabric of claim 8, wherein viscose fibers have a fiber density equal to or less than 1.7 dtex.

11. The nonwoven fabric of claim 2, wherein the nonwoven fabric has an air permeability equal to or greater than 1500 $l/m^2/s$.

* * * * *